3,291,735
ORGANOPOLYSILOXANE LUBRICANTS
Edgar D. Brown, Jr., Schenectady, N.Y., assignor to General Electric Company, a corporation of New York
No Drawing. Filed June 1, 1964, Ser. No. 371,780
5 Claims. (Cl. 252—49.6)

The present invention relates to an organopolysiloxane lubricant composition. More particularly, the present invention relates to a blend comprising a major amount of an organopolysiloxane fluid containing haloaryl radicals attached to silicon and a minor amount of an organopolysiloxane fluid containing chemically combined alkylarylsiloxy units.

Prior to the present invention, it was generally known that organic lubricants, such as mineral oil, were valuable gear lubricants and were capable of performing satisfactorily as a bearing lubricant under sliding friction conditions. However, unlike organopolysiloxane lubricants, organic lubricants cannot be relied upon at extremely low temperatures, such as −100° F., or extremely high temperatures such as up to 600° F. Experience has demonstrated however, that while organopolysiloxane fluids can be utilized over extremes in temperatures, generally they cannot be employed advantageously as both a gear lubricant and a lubricant suitable for bearings subjected to sliding friction. Devices such as clocks and timers, rotisseries, etc., which require gears and bearings subjected to sliding friction often prematurely fail when employed at conditions under which organic lubricants cannot be relied upon.

Organopolysiloxane fluids having chemically combined alkylarylsiloxy units are generally better gear lubricants than mineral oils. However, these fluids also are among the worst known sliding friction lubricants. In applications involving sliding friction, requiring an organopolysiloxane lubricant, organopolysiloxane fluids are preferred having from 5 to 20 mole percent of chemically combined haloarylsiloxy units of the formula, (1) 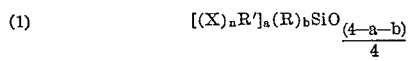

where R is a monovalent hydrocarbon radical, R′ is a polyvalent aryl radical, X is halogen, $n$ is an integer equal to from 1 to 7, inclusive, $a$ is an integer equal to 1 to 3, inclusive, $b$ is a whole number equal to 0 to 2, inclusive, and the sum of $a$ and $b$ is equal to 1 to 3, inclusive. In addition, experience has shown that the organopolysiloxane fluids having the aforedescribed chemically combined haloarylsiloxy units are generally incompatible with organopolysiloxane fluids having chemically combined alkylarylsiloxy units and significantly less effective than the latter fluids as gear lubricants.

The present invention is based on the discovery that organopolysiloxane fluids having up to about 20 mole percent of chemically combined alkylarylsiloxy units and at least 80 mole percent of dialkylsiloxy units advantageously can be uniformly blended with an organopolysiloxane polymer consisting essentially of chemically combined haloarylsiloxy units of Formula 1 and diorganosiloxy units. In addition, the resulting blend can be utilized as both a gear and sliding friction lubricant.

In accordance with the present invention, there is provided a lubricant composition comprising by weight, a uniform blend of (A) 100 parts of a halogenated arylpolysiloxane fluid containing from 3 to 20 mole percent of units of Formula 1, chemically combined with from 97 to 80 mole percent of units of the formula, (2)  $R_2SiO$ based on the moles of said chemically combined units of Formula 1 and Formula 2, and (B) 35 to 65 parts of an alkylarylpolysiloxane fluid containing from 5 to 20 mole percent of units of the formula, (3)  $R''R'''SiO$ chemically combined with 95 to 80 mole percent of units of the formula, (4)  $R'''_2SiO$ based on the moles of said chemically combined units of Formula 3 and Formula 4, where R is defined above, R″ is a monovalent aryl radical and R‴ is a monovalent aliphatic radical.

Radicals included by R of Formula 1 are for example, aryl radicals such as phenyl, xylyl, tolyl, biphenyl, etc.; aralkyl radicals such as phenylethyl, benzyl, etc.; aliphatic and cycloaliphatic radicals such as alkyl, alkenyl, cycloalkyl, including methyl, ethyl, propyl, butyl, cyclohexyl, etc. Radicals included by R′ of Formula 1 are radicals such as $C_6(H)_c(R''')_d$, $C_{10}(H)_e(R''')_d$, etc., where R‴ is more particularly defined below, $c$ is an integer equal to 1 to 4, inclusive, $d$ is a whole number equal to 0 to 3, inclusive, and the sum of $c$ and $d$ is equal to 1 to 4, inclusive, $e$ is an integer equal to 1 to 6, inclusive, and the sum of $d$ and $e$ is equal to 1 to 6. Radicals included by R″ of Formula 3 are for example, aryl radicals such as phenyl, xylyl, tolyl, etc.; radicals included by R‴ include the aliphatic radicals such as alkyl, alkenyl, cycloalkyl, including methyl, ethyl, propyl, butyl, cyclohexyl, etc. In Formulae 1, 2, 3, and 4 above, where R, R′, R″ and R‴ represent more than 1 radical, these radicals can be the same or they can be different.

The halogenated arylpolysiloxane fluids utilized in the lubricant composition of the invention can be made by hydrolyzing haloarylhalosilane of the formula, (5)  $[(X)_nR']_a(R)_bSiX_{(4-a-b)}$ with organohalosilane of the formula, (6)  $(R)_gSiX_{4-g}$ to provide for the production of a hydrolyzate having a ratio of the sum of the $(X)_nR'$ radicals and R radicals to silicon of from about 1.95 to 2.1, where R, R′, X, $a$ and $b$ are as defined above, and $g$ is an integer equal to from 1 to 3, inclusive. Preferably, a proportion of from 15 to 25 moles of diorganodihalosilane included by Formula 6, per mole of said haloarylhalosilane is utilized in the hydrolysis mixture. In addition, to provide for a desirable fluid viscosity, a proportion of up to 10% by weight of triorganohalosilane included by Formula 6 based on the weight of haloarylhalosilane, diorganodihalosilane and triorganohalosilane can be employed.

The resulting hydrolyzate can be equilibrated after it has been recovered from the hydrolysis mixture and neutralized. The hydrolyzate can be equilibrated in accordance with conventional methods with, for example, base catalysts such as an alkali hydroxide, for example, potassium hydroxide, etc. The resulting equilibrated product can have a viscosity in the range between 20 centipoises to 300 centipoises at 25° C., and preferably between 20 centipoises to 100 centipoises at 25° C.

Methods for making haloarylhalosilane of Formula 2 are well known and include for example, direct halogenation, such as chlorination of the corresponding arylorganosilane.

The fluid alkylarylpolysiloxane also can be made in accordance with standard procedures by initially forming a hydrolyzate of units of Formulae 3 and 4. For example, an alkylarylhalosilane of the formula, (7) $\qquad$ R''R'''SiX$_2$ can be hydrolyzed with dialkyldihalosilane, (8) $\qquad$ (R''')$_2$SiX$_2$ along with up to 10% by weight of said halosilane of Formulae 7 and 8 of a triorganohalosilane included by Formula 6. The hydrolyzate then can be equilibrated with a base catalyst by well known means. The resulting fluid can have a viscosity between about 20 centipoises to 50,000 centipoises at 25° C.

The lubricant composition of the invention can be made by mixing together a major amount of the halogenated arylpolysiloxane fluid and a minor amount of the alkylarylpolysiloxane fluid. The resulting blend can be thickened with up to major amounts of conventional thickening agents to produce a grease in accordance with standard grease making procedures. Among the standard thickening agents that can be employed in the practice of the invention are alkali metal salts and alkaline earth metal salts of higher fatty acids which can be either branched-chain, or straight-chain, saturated or unsaturated having from 8 carbon atoms to 20 carbon atoms. A few examples are lithium, sodium, potassium salts of caprylic, prelargonic, capric, undecylic, lauric, myristic, palmitic, stearic, octanoic, 2-ethylhexanoic, oleic, as well as other carboxylic acids derived from tallow, halogenated fish oils and castor oil. In addition to the metallic soaps, antioxidants such as diphenylamine, and inorganic filler materials such as natural clays, carbon black, silica and various metal oxides can also be added.

In particular instances, there can be utilized in the lubricant composition of the invention minor amounts, i.e. up to 10% by weight of such materials as naphthenic acid, stearic acid, etc. to minimize the "creep" tendency of the fluid. It has also been found that the addition of a minor amount, that is, from 1 to 10 weight percent based on the weight of the lubricant composition of a polysiloxane consisting essentially of units having the formula, (9)
$$\begin{array}{c} R''' \\ | \\ SiO \\ | \\ H \end{array}$$

where R''' is defined above, has minimized corrosion problems resulting from the use of the lubricant composition and unexpectedly has improved lubricity.

In order that those skilled in the art will be better able to practice the invention, the following examples are given by way of illustration and not by way of limitation. All parts are by weight.

EXAMPLE 1

A mixture of chlorosilanes consisting of about 9 parts of tetrachlorophenyltrichlorosilane, 83 parts of dimethyldichlorosilane, and 8 parts of trimethylchlorosilane was hydrolyzed at a temperature between 60° C. and 80° C. for a period of about 30 minutes. The hydrolyzate was separated from the aqueous acid layer. It was then treated with a 15% solution of sodium carbonate to neutralize residual hydrolysis acid. The resulting hydrolyzate was then dried with fuller's earth.

The hydrolyzate was equilibrated to a temperature of 180° C. for 2 hours in the presence of 0.1% by weight of potassium hydroxide. There was obtained a fluid having about 6 mole percent of chemically combined tetrachlorophenyl siloxy units and a viscosity of about 65 centipoises at 25° C.

A methylphenylpolysiloxane fluid was prepared by initially hydrolyzing a mixture of methylphenyldichlorosilane, dimethyldichlorosilane, and trimethylchlorosilane. There was utilized in the mixture a proportion of about 6 moles of dimethyldichlorosilane per mole of methylphenyldichlorosilane, and 9% by weight of trimethylchlorosilane based on the total weight of the respective components of the chlorosilane mixture. The hydrolysis was performed at a temperature of about 60° C. for 30 minutes. The hydrolyzate was separated and neutralized as shown above. The hydrolyzate was then dried and equilibrated in the presence of a base catalyst resulting in the production of a methylphenylpolysiloxane fluid having about 15 percent of chemically combined methylphenylsiloxy units and a viscosity of 90 centipoises at 25° C.

A lubricant composition was prepared by mixing together 2 parts of the above-described tetrachlorophenylpolysiloxane fluid, per part of the methylphenylpolysiloxane fluid. The load carrying capacity of the lubricant composition was determined by the standard Navy Gear Wear Test, specification M.I.L.-G.-3278. In this test a stainless steel gear is turned in a reciprocating motion against a bronze gear. The steel gear is preloaded with either a 5# or 10# weight. The wear of the bronze bearing in terms of weight loss in milligrams per 1,000 cycles is determined after 2,000 cycles.

In Table I below there is shown the results of the Navy Gear Wear Test utilizing a 5# load after 2,000 cycles. A comparison is given of the wear that resulted in the bronze gear when utilizing the tetrachlorophenylpolysiloxane fluid, "Tetrachlorophenyl," the methylphenylpolysiloxane fluid, "Methylphenyl" as compared to a "Blend" of two parts of the former with 1 part of the latter.

Table I

|  | Navy Gear Wear Test (wear scar (mg.)/1000 cycles) |
|---|---|
| Tetrachlorophenyl | 8.3 |
| Methylphenyl | 6.7 |
| Blend | 6.3 |

In order to measure the advantages achieved under sliding friction conditions with the lubricant composition of the present invention, as compared to the halogenated arylpolysiloxane fluid, and the alkylarylpolysiloxane fluid, the lubricity of these fluids was measured on a Shell Four Ball Wear Tester.

As known to those skilled in the art, the principle of the Shell Four Ball Wear Tester involves rotating a steel ball against three other steel balls clamped in a rigid plane. The contact pressure between the single ball and the three balls in a plane can be varied. Wear can be measured by the average diameter of the scar on the three rigid balls. Table II shows the results obtained with the tetrachlorophenylpolysiloxane fluid, the methylphenylpolysiloxane fluid, and the blend thereof. The test was run at 212° F. utilizing a 20 kg. load at 600 r.p.m. for 1 hour. "Wear Scar" indicates the average diameter in mm. of the scar of the three balls.

Table II

Four-Ball Wear Tester
(wear scar, mm.)

| | |
|---|---|
| Tetrachlorophenyl | .47 |
| Methylphenyl | 2.8 |
| Blend | .63 |

EXAMPLE 2

A lubricant composition was prepared in accordance with the practice of the invention by mixing together the tetrachlorophenylpolysiloxane fluid and the methylphenylpolysiloxane fluid of Example 1 utilizing 2 parts of the tetrachlorophenylpolysiloxane fluid per part of the methylphenylpolysiloxane fluid. There was then added to the resulting blend, naphthenic acid and a fluid methylhydrogen polysiloxane consisting essentially of chemically combined $$\begin{array}{c} CH_3 \\ | \\ SiO \\ | \\ H \end{array}$$

units. The naphthenic acid and the methyl hydrogen polysiloxane fluid were utilized respectively in amounts sufficient to provide about 1% by weight of each in the mixture based on the total weight of the components. The mixture was then tested in accordance with the Navy Gear Wear Test and the Shell Four Ball Wear Test utilizing the conditions of Example 1. However, with respect to the Navy Gear Wear Test, the lubricity of the mixture was measured under a 5# load, and 10# load. The results of the test are shown in Table III below.

Table III

| | Navy Gear Wear Test (mg./1,000 cycles) | Shell Four Ball Wear Test (mm.) |
|---|---|---|
| 5# | 3 | 0.5 |
| 10# | 4.8 | |

EXAMPLE 3

A mixture of the tetrachlorophenylpolysiloxane fluid and the methylphenylpolysiloxane fluid of Example 1 was made in which there was utilized 2 parts of the tetrachlorophenylpolysiloxane, per part of the methylphenylpolysiloxane. This mixture was equilibrated for 2 hours at 160° C. in the presence of a potassium hydroxide catalyst. The fluid was filtered and stripped to 285° C. at 1 mm. The product was a fluid polysiloxane having a viscosity of 65 centipoises at 25° C. and composed of chemically combined tetrachlorophenylsiloxy units, methylphenylsiloxy units, dimethylsiloxy units, and chain-stopped with trimethylsiloxy units. Based on method of preparation, the chemically combined units in the fluid polysiloxane were in the same ratio as the units in the blend prepared by mixing two parts of the tetrachlorophenylpolysiloxane fluid and 1 part of the methylphenylsiloxane in accordance with the practice of the invention.

Table IV below shows the wear results obtained with the above-described "Equilibrated Fluid" obtained by equilibrating the tetrachlorophenylpolysiloxane fluid and the methylphenylpolysiloxane fluid as compared to the "Blend" of the same ingredients. The Navy Gear Wear Test and the Shell Four Ball Wear Test were run under the same conditions as utilized in Example 1.

Table IV

| | Navy Gear Wear Test (mg./1,000 cycles) | Shell Four Ball Wear Test (mm.) |
|---|---|---|
| Equilibrated Fluid | 10.8 | 0.53 |
| Blend | 6.3 | 0.63 |

Based on the above results shown in Tables I to IV, those skilled in the art would know that the lubricant composition of the present invention provides for improved lubricity over the tetrachlorophenylpolysiloxane fluid and the methylphenylpolysiloxane fluid. It also is significant to note that when the lubricant composition of the present invention is combined with naphthenic acid and the methyl hydrogen polysiloxane, as shown in Table III, that significantly improved lubricity is achieved. In addition, the unexpected results obtained by the blending of the aforedescribed tetrachlorophenylpolysiloxane fluid and methylphenylpolysiloxane fluid is shown in Table IV, where it is compared with the equilibrated fluid composed of the same chemically combined units in the same proportion by weight. The blend exhibits substantially the same lubricity as the equilibrated fluid under sliding friction conditions (Shell Four Ball Wear Test); it is substantially better however, than the equilibrated fluid as a gear lubricant. Thus, the blend provides for significant advantages in applications such as clocks and timers exposed to elevated temperatures, rotisseries, etc. which utilize gears and bearings subject to sliding friction.

While the foregoing examples have of necessity been limited to only a few of the very many variables within the scope of the present invention, it should be understood that the present invention provides for the production of a much broader class of lubricant compositions comprising a blend of the haloarylpolysiloxane fluid composed of chemically combined units of Formulae 1 and 2, and the alkylarylpolysiloxane fluid composed of chemically combined units of Formulae 3 and 4.

What I claim as new and desire to secure by Letters Patent of the United States is:

1. A lubricant composition comprising by weight a uniform blend of (1) 100 parts of a chlorinated phenylpolysiloxane fluid containing from 3 to 20 mole percent of tetrachlorophenylsiloxy units chemically combined with from 97 to 80 mole percent of dimethylsiloxy units, based on the total moles of said chemically combined units, and (2) 35 to 65 parts of a methylphenylpolysiloxane fluid containing from 5 to 20 mole percent of methylphenylsiloxy units chemically combined with 95 to 80 mole percent of dimethylsiloxy units based on the total moles of said chemically combined units.

2. A fluid composition in accordance with claim 1 containing up to 10 percent by weight of an alkyl hydrogen polysiloxane fluid consisting essentially of units of the formula, $$\begin{array}{c} R''' \\ | \\ SiO \\ | \\ H \end{array}$$

where R''' is a monovalent alkyl radical.

3. A lubricant composition comprising by weight a uniform blend of a tetrachlorophenylpolysiloxane fluid and a methylphenylpolysiloxane fluid in which there is utilized about 2 parts of said tetrachlorophenylpolysiloxane fluid per part of said methylphenylpolysiloxane fluid, said tetrachlorophenylpolysiloxane contains from 3 to 20 mole percent of tetrachlorophenylsiloxy units chemically combined with from 97 to 80 mole percent of dimethylsiloxy units based on the total moles of said chemically combined units, said methylphenylpolysiloxane fluid contains from 5 to 20 mole percent of methylphenylsiloxy units chemically combined with 95 to 80 mole percent of dimethylsiloxy units based on the total moles of said chemically combined units.

4. A composition in accordance with claim 3 containing a minor amount of naphthenic acid.

5. A composition in accordance with claim 3 containing a minor amount of a fluid consisting essentially of $$\begin{array}{c} CH_3 \\ | \\ SiO \\ | \\ H \end{array}$$

units.

(References on following page)

References Cited by the Examiner

UNITED STATES PATENTS

| | | |
|---|---|---|
| 2,471,850 | 5/1949 | Wilcock _____ 252—49.6 |
| 2,491,843 | 12/1949 | Wilcock _____ 252—49.6 X |
| 2,599,917 | 6/1952 | Hommel _____ 252—49.6 X |
| 2,599,984 | 6/1952 | Fletcher _____ 252—49.6 X |
| 2,614,989 | 10/1952 | Hunter et al. _____ 252—49.6 |
| 2,689,859 | 9/1954 | Burkhard _____ 252—49.6 X |
| 2,809,207 | 10/1957 | Gainer _____ 252—49.6 X |
| 2,821,507 | 1/1958 | Gainer et al. _____ 252—49.6 |
| 2,848,417 | 8/1958 | Armstrong _____ 252—49.6 X |
| 3,180,832 | 4/1965 | Furey _____ 252—56 |

FOREIGN PATENTS

| | | |
|---|---|---|
| 667,170 | 2/1952 | Great Britain. |
| 688,166 | 2/1953 | Great Britain. |

OTHER REFERENCES

Cottinton et al.: "Industrial & Eng. Chem.," vol. 48 (1956), pages 943–950.

DANIEL E. WYMAN, *Primary Examiner.*

W. H. CANNON, *Assistant Examiner.*